United States Patent [19]
Umegaki et al.

[11] Patent Number: 4,820,011
[45] Date of Patent: Apr. 11, 1989

[54] OPTICAL WAVELENGTH CONVERSION DEVICE, AND A METHOD OF MAKING THE SAME

[75] Inventors: Shinsuke Umegaki; Yoji Okazaki; Kozi Kamiyama, all of Kanagawa, Japan

[73] Assignee: Fuji Photo Film Co., Ltd., Kanagawa, Japan

[21] Appl. No.: 70,442

[22] Filed: Jul. 7, 1987

[30] Foreign Application Priority Data

Jul. 7, 1986 [JP] Japan .................................. 61-159292
Jul. 7, 1986 [JP] Japan .................................. 61-159293

[51] Int. Cl.⁴ ........................... G02B 6/34; G02B 6/26
[52] U.S. Cl. ................................ 350/96.19; 350/96.15
[58] Field of Search ................ 350/96.15, 96.19, 96.29

[56] References Cited

U.S. PATENT DOCUMENTS

| 4,382,660 | 5/1983 | Pratt, Jr. et al. | 350/96.14 |
| 4,557,551 | 12/1985 | Dyott | 350/96.10 |
| 4,583,817 | 4/1986 | Papuchon | 350/96.11 |
| 4,655,547 | 4/1987 | Heritage et al. | 350/96.11 |

Primary Examiner—William L. Sikes
Assistant Examiner—Akm E. Ullah
Attorney, Agent, or Firm—Sughrue, Mion, Zinn, Macpeak & Seas

[57] ABSTRACT

An optical wavelength conversion device is constituted by a pair of substrates disposed facing each other, and an optical waveguide formed of a nonlinear optical material and disposed between the substrates, thereby to convert a fundamental wave entering the optical wavelength conversion device formed to a second harmonic which is phase matched by Cherenkov radiation. At least one of the substrates is provided with a grating for entry of the fundamental wave, which is formed on a surface contacting the optical waveguide, and/or with a grating for radiation of the second harmonic, which is formed on a surface opposite to the surface contacting the optical waveguide. The optical wavelength conversion device is made by forming grooves on the substrates, filling a slight space between the substrates with a crystallizable organic nonlinear optical material, and gradually crystallizing the optical material.

4 Claims, 2 Drawing Sheets

OPTICAL WAVELENGTH CONVERSION DEVICE, AND A METHOD OF MAKING THE SAME

BACKGROUND OF THE INVENTION

1. Field of the Invention

This invention relates to an optical wavelength conversion device for converting an optical fundamental wave entering the device to an optical second harmonic having a wavelength one half the wavelength of the fundamental wave. This invention particularly relates to an optical waveguide type optical wavelength conversion device. This invention also relates to a method of making an optical waveguide type optical wavelength conversion device having an optical waveguide formed of a crystalline organic nonlinear optical material.

2. Description of the Prior Art

Various attempts have heretofore been made to convert the wavelength of a laser beam to a shorter wavelength by utilization of optical second harmonic generation using a nonlinear optical material. As an optical wavelength conversion device for carrying out wavelength conversion in this manner, there have heretofore been known a bulk crystal type device as disclosed in, for example, Japanese Unexamined Patent Publication No. 51(1976)-2651, and an optical waveguide type device as disclosed in, for example, Japanese Unexamined Patent Publication No. 60(1985)-14222. When the bulk crystal type optical wavelength conversion device and the optical waveguide type optical wavelength conversion device are compared with each other, the latter can confine an optical wave in a smaller region, and therefore can increase the power density and achieve a higher wavelength conversion efficiency than with the former.

Accordingly, in recent years, extensive research has been conducted on the optical waveguide type optical wavelength conversion device. The optical waveguide type optical wavelength conversion device is constituted by a pair of substrates disposed facing each other, and an optical waveguide formed of a nonlinear optical material having a refractive index higher than the refractive indexes of the substrates and formed between the substrates. For example, in the optical wavelength conversion device, phase matching is effected between the guided mode of the fundamental wave through the optical waveguide and the radiation mode of a second harmonic to the substrate section (in the case of Cherenkov radiation).

However, the conventional optical waveguide type optical wavelength conversion device has the drawback in that it is not always possible to achieve entry of the fundamental wave into the device and radiation (take-up) of the second harmonic from the device. Specifically, in many cases, a coupler prism has heretofore been closely contacted with the surface of the substrate for introducing the fundamental wave into the optical wavelength conversion device by the coupler prism. However, when the coupler prism is strongly press fitted to the optical wavelength conversion device (directly to the substrate) in order to achieve close contact therebetween, the optical wavelength conversion device is often broken by the pressing force. Also, the second harmonic has heretofore been radiated from an end face of the optical wavelength conversion device. However, in this case, the phase of the optical wave taken up from the optical wavelength conversion device varies, and therefore it is not always possible to converge the optical wave to a desired beam diameter.

SUMMARY OF THE INVENTION

The primary object of the present invention is to provide an optical wavelength conversion device which facilitates entry of a fundamental wave into the device and radiation of a second harmonic out of the device.

Another object of the present invention is to provide an optical wavelength conversion device which radiates a phase-matched second harmonic.

The specific object of the present invention is to provide a method of making an optical wavelength conversion device wherein an organic nonlinear optical material constituting an optical waveguide is formed substantially long in a single crystal condition.

The present invention provides an optical wavelength conversion device constituted by a pair of substrates disposed facing each other, and an optical waveguide formed of a nonlinear optical material and disposed between the substrates, thereby to convert a fundamental wave entering the optical wavelength conversion device to a second harmonic which is phase matched by Cherenkov radiation, wherein the improvement comprises providing at least one of said substrates with a grating for entry of said fundamental wave, which is formed on a surface contacting said optical waveguide, and/or with a grating for radiation of said second harmonic, which is formed on a surface opposite to said surface contacting said optical waveguide.

With the optical wavelength conversion device in accordance with the present invention wherein a grating is formed on the surface of the substrate contacting the optical waveguide, the fundamental wave incident upon the grating can readily enter the optical waveguide. On the other hand, in the case where a grating is formed on the substrate surface opposite to the surface contacting the optical waveguide, i.e. on the outer surface of the substrate, the second harmonic advancing through total reflection between the outer surfaces of the substrates can be readily taken out of the optical wavelength conversion device by matching the phase by the grating.

The phase-matched and radiated second harmonic can be converged into a desired beam diameter by use of an external lens. Or, in the case where a focusing grating coupler is formed as the grating for radiation of the second harmonic, the radiated second harmonic can be converged by the focusing grating coupler and taken out of the optical wavelength conversion device. Accordingly, the optical wavelength conversion device in accordance with the present invention is applicable to a wide variety of use categories.

As the nonlinear optical material for forming the optical waveguide, an organic nonlinear optical material having a non-linear optical constant markedly larger than the non-linear optical constant of an inorganic material such as $LiNbO_3$ or KDP ($KH_2PO_4$) should preferably be used. As the organic nonlinear optical material, it is possible to use, for example, 2-methyl-4-nitroaniline (MNA), methanitroaniline (mNA), 3-methyl-4-nitropyridine-1-oxide (POM), or urea. For example, MNA has a wavelength conversion efficiency approximately 2,000 times the wavelength conversion efficiency of $LiNbO_3$ as an inorganic nonlinear optical material. Therefore, when the optical wavelength conversion device having the optical waveguide formed of the organic nonlinear optical material is used, a short wavelength laser beam of blue region can be obtained by generating a second harmonic from an infrared laser beam emitted as the fundamental wave from a popular small and low-cost semi-conductor laser.

The present invention also provides a method of making an optical wavelength conversion device, which comprises the steps of:

(i) forming a plurality of grooves side by side in spaced relation to each other on one surface of at least one of two substrates, (ii) securing said two substrates to each other so that they face each other in slightly spaced relation to each other with said one surface facing inward, (iii) filling the slight space between said two substrates with a crystallizable organic nonlinear optical material having a refractive index higher than the refractive index of the substrate material, and (iv) gradually drawing said substrates from inside of a furnace kept at a temperature higher than a melting point of said crystallizable organic nonlinear optical material to the outside kept at a temperature lower than said melting point, thereby to cause said crystallizable organic nonlinear optical material in the molten condition to crystallize from a drawing-out section to the outside of said furnace.

When the space between the substrates is filled with the crystallizable organic nonlinear optical material and the substrates are placed in a furnace kept at a temperature higher than the melting point of the crystallizable organic nonlinear optical material, the crystallizable organic nonlinear optical material is molten. As the substrates are then drawn out of the furnace, the single crystal of the optical material grows gradually at the boundary surface between the liquid phase and the solid phase of the crystallizable organic nonlinear optical material. At this time, since the grooves are formed as mentioned above on the inner surface of the substrate, i.e. on the substrate surface contacting the optical material, the single crystal grows independently in each of the narrow regions among the grooves. Therefore, an optical waveguide constituted by the optical material in a markedly long single crystal condition is formed.

With the method of making an optical wavelength conversion device in accordance with the present invention, it is possible to obtain an optical waveguide type optical wavelength conversion device having a wavelength conversion efficiency markedly higher than the wavelength conversion efficiency of the conventional optical wavelength conversion device. Therefore, a short-wavelength laser which is compact and cheap and requires little electric power can be formed by use of a semiconductor laser of a small optical output and low cost. Also, since the optical waveguide wherein the crystal directions are different among the regions between the respective adjacent grooves on the substrate can be formed, it becomes possible to adjust desired crystal directions with respect to the wave guide direction by selecting the region which is to be utilized for optical wavelength conversion.

DESCRIPTION OF THE PREFERRED EMBODIMENTS

The present invention will hereinbelow be described in further detail with reference to the accompanying drawings.

Figure 1:
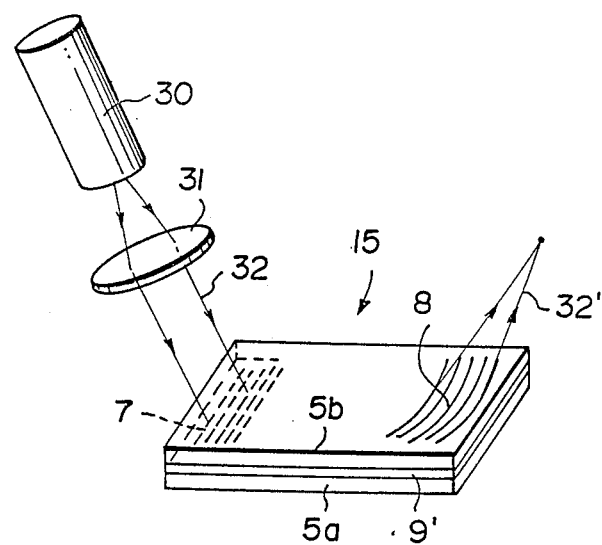
FIG. 1 is a perspective view showing an embodiment of the optical wavelength conversion device in accordance with the present invention.

Referring to FIG. 1, an optical wavelength conversion device 15 is constituted by a pair of glass substrates 5a and 5b disposed facing each other with a slight space intervening therebetween, and an optical waveguide 9' formed between the glass substrates 5a and 5b. By way of example, the optical waveguide 9' is formed of MNA as an organic nonlinear optical material. A linear grating coupler (hereinafter abbreviated as LGC) 7 for entry of a fundamental wave is formed on the surface of the glass substrate 5b contacting the optical waveguide 9'. On the surface of the glass substrate 5b opposite to said surface contacting the optical waveguide 9', i.e. on the outer surface of the glass substrate 5b, a focusing grating coupler (hereinafter abbreviated as FGC) 8 for radiation of a second harmonic is formed in substantially spaced relation to the LGC 7.

Figure 2:
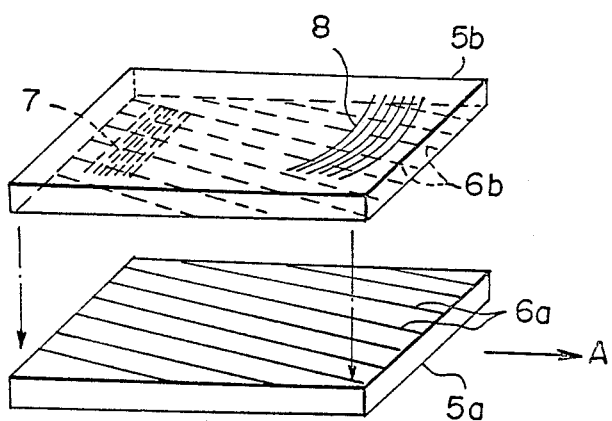
FIGS. 2, 3 and 4 are perspective views showing steps of making the embodiment shown in FIG. 1.
Figure 3:
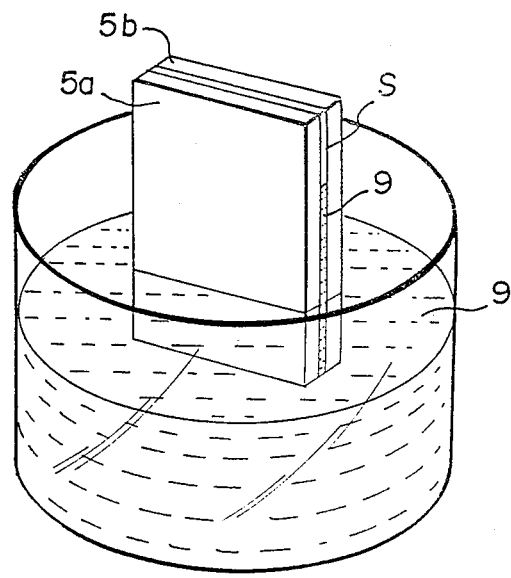
Figure 4:
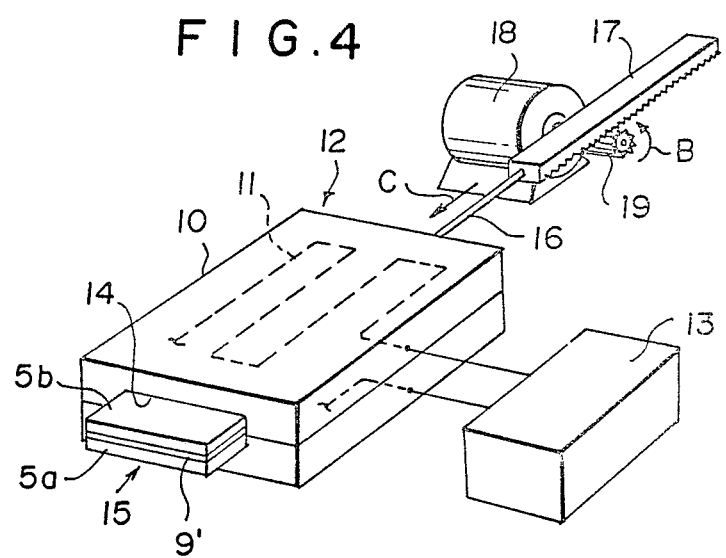

A method of making the optical wavelength conversion device 15 having the aforesaid configuration will now be described below with reference to FIGS. 2, 3 and 4. First, as shown in FIG. 2, the flat glass substrates 5a and 5b having a refractive index smaller than the refractive index of MNA are prepared. A plurality of grooves 6a, 6a, . . . are formed in parallel with each other by known photo-lithography on one surface of the glass substrate 5a. By way of example, the grooves 6a, 6a, ... are formed to a depth of approximately 5 μm and disposed at intervals of approximately 0.5 mm and at an angle of, for example, approximately 50° with respect to a longitudinal direction A of the glass substrate 5a (the longitudinal direction A coincides with the direction of drawing-out from a furnace as will be described later). Also, grooves 6b, 6b, . . . are formed on one surface of the other glass substrate 5b in the same manner as the grooves 6a, 6a, . . . . The grooves 6b, 6b, . . . are formed at the same intervals and at the same angle as those of the grooves 6a, 6a, . . . so that the former match with the latter when the glass substrates 5a and 5b are secured facing each other as will be described later. The glass substrate 5b is provided with the LGC 7 at one end portion of the surface having the grooves 6b, 6b, . . . formed thereon, i.e. of the lower surface of the glass substrate 5b in FIG. 2. On the surface of the glass substrate 5b opposite to said surface provided with the LGC 7, i.e. on the upper surface thereof in FIG. 2, the FGC 8 is formed in substantially spaced relation to the LGC 7. The LGC 7 and the FGC 8 are formed by known photo-lithography, and the grating opening size is adjusted to approximately 2 mm×2 mm for example.

The glass substrates 5a and 5b are superposed one upon the other with the surfaces provided with the grooves 6a, 6a, . . . and the grooves 6b, 6b, . . . facing inward as shown in FIG. 2. At this time, the orientations of the glass substrates 5a and 5b are made to strictly coincide with each other so that the grooves 6a, 6a. . . and the grooves 6b, 6b, . . . match with each other. After the glass substrates 5a and 5b are superposed one upon the other in this manner, they are adhered together. As a result, a slight space within the range of approximately 0.5 μm to approximately 1.0 μm is formed between the glass substrates 5a and 5b.

Thereafter, the slight space between the glass substrates 5a and 5b is filled with MNA as a crystallizable organic nonlinear optical material for constituting the optical waveguide. Filling of the slight space with MNA is carried out as shown in FIG. 3. Specifically, MNA 9 is kept in a melt condition in a furnace or the like, and one end of each of the glass substrates 5a and 5b is dipped in the molten MNA 9. As a result, the molten MNA 9 enters a space S between the glass substrates 5a and 5b by capillary action. In order to prevent the molten MNA 9 from decomposing, the temperature of the molten MNA 9 is kept at a value slightly higher than the melting point (132° C.) thereof. Then, the glass substrates 5a and 5b are quenched to solidify the MNA 9 in the space S.

The optical waveguide device 15 having a layer of the MNA 9 formed between the glass substrates 5a and 5b is then introduced into a furnace, and the MNA 9 again becomes molten. In this embodiment, as shown in FIG. 4, a brass furnace 12 comprising a brass block 10 and an electric heating means 11 embedded in the brass block 10 is used as the aforesaid furnace. An elongated hole 14 having a rectangular cross-sectional shape is formed at the center of the brass furnace 12. An electric current is supplied to the electric heating means 11 via a temperature control circuit 13 for keeping the temperature in the hole 14 at a desired value. The optical waveguide device 15 is accommodated in the hole 14.

The temperature of the brass furnace 12 (i.e., in the strict sense, the temperature in the hole 14) is kept at approximately 141° C., slightly higher than the melting point of the MNA 9. Grease or the like should preferably be applied in advance to the inside of the hole of the brass furnace 12 for improving thermal conductivity from the brass furnace 12 to the optical waveguide device 15 and for making constant the speed of drawing out as will be described later. The hole 14 is opened at one end face of the block 10, i.e. at the forward end face in FIG. 4, and is closed at the other end face of the block 10. The closed end face of the block 10 is provided with a small hole (not shown) communicating with the hole 14, and a wire 16 is inserted into the small hole. The wire 16 is secured to a rack 17 meshed with a pinion 19 rotated by a motor 18. Therefore, when the motor 18 is operated to rotate the pinion 19 in the direction as indicated by the arrow B, the wire 16 is moved in the direction as indicated by the arrow C to push the optical waveguide device 15 in the hole 14 out of the block 10. The temperature outside of the brass furnace 12 is adjusted to a value (e.g. approximately room temperature) lower than the melting point of the MNA 9.

As the optical waveguide device 15 is accommodated in the brass furnace 12 in the manner as mentioned above, the MNA 9 between the glass substrates 5a and 5b becomes molten again. In this condition, the motor 18 is operated at a low speed to move the wire 16 as mentioned above. As a result, the optical waveguide device 15 is gradually drawn out of the brass furnace 12. By way of example, the drawing-out speed of the optical waveguide device 15 is adjusted to a value within the range of approximately 1.5 cm/hour to approximately 2.0 cm/hour. As the optical waveguide device 15 is gradually drawn out of the brass furnace 12, the MNA single crystal grows little by little at the boundary surface between the liquid phase and the solid phase of the MNA 9 (the boundary surface is naturally at the outside of the brass furnace 12). Therefore, an optical waveguide 9' consisting of the MNA 9 in the single crystal condition having a uniform crystal direction is formed over a long distance, e.g. over several centimeters, in the optical waveguide device 15 drawn out of the brass furnace 12. The MNA single crystal is formed in the unit of each of the regions between the grooves 6a, 6a, . . . and grooves 6b, 6b, . . (specifically, in the unit of each region between the grooves 6a and 6a adjacent to each other and between the grooves 6b, 6b, . . . adjacent to each other), and the crystal directions differ among the respective regions. The crystal condition can be confirmed by observing extinction by disposing the optical waveguide device 15 between crossed nicols of a polarizing microscope. In this manner, the optical waveguide device 15 (i.e. the optical wavelength conversion device) having MNA in the single crystal condition as the optical waveguide 9' is obtained.

The action of the optical wavelength conversion device 15 formed in the manner as mentioned above will hereinbelow be described with reference to FIG. 1. By way of example, in this embodiment, the optical wavelength conversion device 15 is formed to have an overall length of 1.2 cm. A Q-switch YAG laser (wavelength: 1.06 μm) 30 is used as the fundamental wave generating means, and a laser beam (fundamental wave) 32 guided by an objective lens 31 is made to impinge upon the LGC 7, thereby to make the laser beam 32 enter the optical waveguide 9'. Phase matching is effected by Cherenkov radiation wherein a second harmonic 32' is generated as the radiation mode to the substrate section from the nonlinear polarized wave generated by the guided mode of the fundamental wave through the optical waveguide 9'. The second harmonic 32' is taken up out of the optical wavelength conversion device 15 at the FGC 8 formed on the outer surface of the substrate 5b. At this time, the second harmonic 32' is phase matched by the FGC 8 and converged to a single spot.

In the manner as mentioned above, entry of the fundamental wave (laser beam 32) and taking-out of the second harmonic 32' can be carried out very easily. Since the second harmonic 32' is taken out of the optical wavelength conversion device 15 after being phase matched by the grating, the second harmonic 32' can be converged to a desired beam diameter. The FGC 8 used as the grating for radiation of the second harmonic in the aforesaid embodiment may be replaced by a LGC. Also in this case, the second harmonic 32' can be phase matched and taken out of the optical wavelength conversion device 15 as a collimated optical wave. When the phase of the second harmonic 32' is matched, the second harmonic 32' can be converged by use of an external lens.

In this embodiment, the glass substrates 5a and 5b are provided with the grooves 6a, 6a, . . . and grooves 6b, 6b, . . . , and therefore the optical waveguide 9' is divided into a plurality of elongated single crystal regions. Also, the sizes of the LGC 7 and the FGC 8 are adjusted to be substantially larger than the intervals between the grooves 6a and 6a adjacent to each other (or the intervals between the grooves 6b and 6b adjacent to each other), and therefore the respective single crystal regions optically couple the LGC 7 with the FGC 8. Accordingly, the optical waveguide having a desired crystal direction can be selected arbitrarily and utilized.

In the aforesaid embodiment, both the glass substrates 5a and 5b are provided respectively with the grooves 6a, 6a, ... and grooves 6b, 6b, .... However, the effects of substantially crystallizing the organic nonlinear optical material into the single crystal can be obtained also when the grooves are formed only on one of the glass substrates 5a and 5b. In the case where the grooves are formed only one of the glass substrates 5a and 5b, the grooves should preferably be formed on the substrate which is not provided with the aforesaid gratings in order to facilitate the formation of the grooves and the gratings. Though the grooves 6a, 6a, ... and grooves 6b, 6b, ... need not necessarily be provided, they should preferably be provided for substantially crystallizing the organic nonlinear optical material into the single crystals and improving the wavelength conversion efficiency.

Also, either one of the LGC 7 for entry of the fundamental wave and the FGC 8 for radiation of the second harmonic in the aforesaid embodiment may be omitted, and the fundamental wave may be made to enter from the end face of the substrate 5b, or the second harmonic may be radiated out of the end face thereof.

Though MNA which is an organic optical material is used as the nonlinear optical material in the aforesaid embodiment, the optical waveguide may also be formed by use of other organic or inorganic nonlinear optical materials.

In the experiments carried out for making the optical wavelength conversion device, the second harmonic 32' was obtained in the manner as mentioned above, and the intensity thereof was measured with a laser power meter. The wavelength conversion efficiency, i.e. the ratio of the measured optical intensity of the second harmonic 32' to the optical output of the fundamental wave, was approximately 0.1% in the case where the optical output of the fundamental wave was approximately several hundreds of milliwatts. Since the wavelength conversion efficiency is also proportional to the optical output of the fundamental wave, a wavelength conversion efficiency higher by not less than 2 orders of ten than with the conventional optical wavelength conversion device in the case where the optical output of the fundamental wave is increased.

Though the aforesaid grooves may be formed in parallel with the direction of drawing-out of the glass substrates 5a and 5b from the furnace, the grooves should preferably be formed at an angle as mentioned above with respect to the substrate drawing-out direction for achieving good crystallization of the organic nonlinear optical material into single crystal.

We claim:

1. An optical wavelength conversion device constituted by a pair of substrates disposed facing each other, and an optical waveguide formed of a nonlinear optical material and disposed between the substrates, thereby to convert a fundamental wave entering the optical wavelength conversion device to a second harmonic which is phase matched by Cherenkov radiation, wherein the improvement comprises providing at least one of said substrates with a first grating to facilitate entry of said fundamental wave, said first grating being formed on a surface contacting said optical waveguide, and providing said at least one substrate with a second grating to facilitate radiation of said second harmonic, said second grating being formed on a surface opposite to said surface contacting said optical waveguide.

2. A device as defined in claim 1 wherein said optical waveguide is formed of a crystallizable organic nonlinear optical material.

3. A device as defined in claim 2 wherein said optical waveguide is constituted by a plurality of optical material single crystal sections disposed side by side in the width direction of two gratings, and said two gratings are optically coupled with each other by each of said optical material single crystal sections.

4. A device as defined in claim 1, 2 or 3 wherein said grating for radiation of said second harmonic is a focusing grating coupler.

* * * * *